United States Patent [19]

Krishnan et al.

[11] Patent Number: 5,998,520
[45] Date of Patent: Dec. 7, 1999

[54] PHOTOCHROMIC COMPOSITIONS HAVING IMPROVED FADE RATE

[75] Inventors: Sivaram Krishnan, Pittsburgh; Robert A. Pyles, Bethel Park; James B. Johnson, Washington; Michael P. Jenkins, McKeesport; Timothy J. Pike, Bethel Park, all of Pa.

[73] Assignee: Bayer Corporation, Pittsburgh, Pa.

[21] Appl. No.: 08/887,075

[22] Filed: Jul. 2, 1997

[51] Int. Cl.$^6$ ........................................ C08K 5/15
[52] U.S. Cl. ..................... 524/110; 524/94; 524/108; 524/109
[58] Field of Search .............................. 524/110

[56] References Cited

U.S. PATENT DOCUMENTS

| | | | |
|---|---|---|---|
| 3,562,172 | 2/1971 | Ono et al. | 252/300 |
| 3,578,602 | 5/1971 | Ono et al. | 252/300 |
| 4,215,010 | 7/1980 | Hovey et al. | 252/300 |
| 4,342,668 | 8/1982 | Hovey et al. | 252/586 |
| 4,826,977 | 5/1989 | Heller et al. | 544/70 |
| 4,931,221 | 6/1990 | Heller | 252/586 |
| 5,106,998 | 4/1992 | Tanaka et al. | 549/331 |
| 5,411,679 | 5/1995 | Kumar | 252/586 |
| 5,451,344 | 9/1995 | Knowles et al. | 252/586 |
| 5,552,090 | 9/1996 | Van Gemert et al. | 252/586 |
| 5,565,147 | 10/1996 | Knowles et al. | 252/589 |
| 5,628,935 | 5/1997 | Hughes et al. | 252/589 |
| 5,708,064 | 1/1998 | Coleman et al. | 524/90 |

FOREIGN PATENT DOCUMENTS

| | | |
|---|---|---|
| 4304488 | 6/1994 | Germany . |
| 94/08260 | 4/1994 | WIPO . |

OTHER PUBLICATIONS

Applied Photochromic Polymer Systems, Edited by C. B. McArdle, Blackie USA Chapman & Hall, New York, (month unavailable) 1992, pp. 80–120.

*Primary Examiner*—Kriellion Sanders
*Attorney, Agent, or Firm*—Joseph C. Gil; Aron Preis

[57] ABSTRACT

A thermoplastic molding composition is disclosed comprising (A) at least one resinous component selected from the group consisting of (i) a homogeneous blend of polycarbonate resin and polycaprolactone and (ii) a copoly(carbonate-lactone) copolymer, and (B) at least one compound selected from a group consisting of benzopyrans, naphthopyrans, spirobenzopyrans, spironaphthopyrans, spirobenzoxazines, spironaphthoxazines, fulgides and fulgimides. The composition which contains the photochromic compound at an amount of 0.01 to 1.0 parts per hundred parts of weight of said (A) exhibits good photochromic properties.

16 Claims, No Drawings

PHOTOCHROMIC COMPOSITIONS HAVING IMPROVED FADE RATE

BACKGROUND OF THE INVENTION

The present invention relates to thermoplastic molding compositions and more particularly to compositions having photochromic properties.

A thermoplastic molding composition is disclosed comprising (A) at least one resinous component selected from the group consisting of (i) a homogeneous blend of polycarbonate resin and polycaprolactone and (ii) a copoly (carbonate-lactone) copolymer, and (B) at least one compound selected from a group consisting of benzopyrans, naphthopyrans, spirobenzopyrans, spironaphthopyrans, spirobenzoxazines, spironaphthoxazines, fulgides and fulgimides. The composition which contains the photochromic compound at an amount of 0.01 to 1.0 parts per hundred parts by weight of said (A) exhibits good photochromic properties.

Photochromic molding compositions are characterized in that upon exposure to electromagnetic radiation or to solar light they exhibit a reversible change in color and in light transmission. Once the exposure to the original radiation has been discontinued, the composition returns to its original color, or colorless state. Recently, photochromic plastic materials, most notably, such compositions which may be suitable for the preparation of ophthalmic lenses, films and automotive head lamp lenses have been the focus of attention in the relevant arts. Plastic materials as the medium for the preparation of such lenses allow for the preparation of lighter and thinner lenses than does the traditionally used glass. Also of interest are the applications of photochromic technology to automotive, aircraft transparencies and greenhouse architecture and other glazing applications.

It is known that photochromic behavior may be imparted to glass and to certain plastic materials by using inorganic and organic dyes respectively. However, when these dyes are incorporated into polycarbonate based on bisphenol-A, the photochromic dyes' change in color is very slow. Since the transition rate is slow, polycarbonate photochromic products can not compete commercially with photochromic glass and allyl resin plastics and are, therefore, unknown.

The relevant art includes U.S. Pat. No. 3,567,605 which disclosed a series of pyran and chromene derivatives that have been reported to undergo color change on exposure to that radiation. Also relevant are U.S. Pat. Nos. 5,451,344 and 5,552,090 which disclosed photochromic naphthopyrans which are useful in the present invention. The '090 document disclosed the utility of such compounds in the preparation of photochromic articles molded of any of polymeric resins including thermoplastic polycarbonate resins. Also relevant is U.S. Pat. No. 4,064,195 which disclosed a molding composition containing polycarbonate and polycaprolactone polymer.

The present invention relates to a novel molding composition containing polycarbonate resin, polycaprolactone and a photochromic compound. The composition which is transparent and features desirable photochromic kinetics makes it particularly suitable in the preparation of lenses and in glazing applications. The inventive composition demonstrates rapid transition between dark and light upon the exposure to and removal from the radiation source. In addition, transparency of the polycarbonate is retained along with sufficient impact resistance, setting it apart from the corresponding compositions which are based on allyl resin and on glass which are currently used in commercial photochromic applications.

The thermoplastic molding composition of the present invention comprises (A) at least one resinous component which may be a homogeneous blend of polycarbonate resin and polycaprolactone (PCL) or a copoly(carbonate-lactone) copolymer, and (B) at least one compound selected from a group consisting of benzopyrans, naphthopyrans, spirobenzopyrans, spironaphthopyrans, spirobenzoxazines, spironaphthoxazines, fulgides and fulgimides.

In the embodiment wherein A is a blend, the composition contains about 1 to 50 mole percent of polycaprolactone (the indicated percents throughout the present text refer to percent relative to the total weight of resinous components and photochromic compound) and a positive amount of the photochromic compound, the amount being sufficient to render the composition photochromic. More preferably, the composition contains about 5 to 50% of PCL, 95 to 50% of polycarbonate and about 0.01 to 1.0 parts, preferably 0.03 to 0.5 parts per hundred parts of resin (pphr) of the photochromic compound. Polycaprolactone in the context of the invention is a polymeric resin having a weight average molecular weight of up to about 250,000, preferably 25,000 to 150,00, most preferably 30,000 to 100,000, the molecular structure of which contains units conforming to

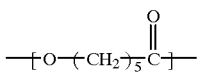

Suitable PCL are partially crystalline resins which are commercially available, such as from Union Carbide under the name Tone Polymers P-767 and P-787. The PCL preferably has a reduced viscosity (measured with 0.2 g of polymer in 100 milliliter benzene at 30° C.) of about 0.1 to 1.5, more preferably about 0.5 to 0.9.

The PCL is a linear polyester formed through the ring opening reaction of ε-caprolactone.

Aromatic polycarbonates within the scope of the present invention are homopolycarbonates, copolycarbonates branched polycarbonate and mixtures thereof. The polycarbonates generally have a weight average molecular weight of 10,000 to 200,000, preferably 20,000 to 80,000 and their melt flow rate, per ASTM D-1238 at 300° C., is about 1 to about 65 g/10 min., preferably about 2 to 15 g/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the invention conform to the structural formulae (1) or (2).

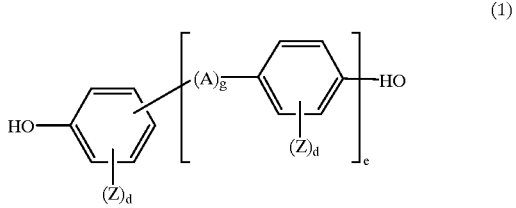

(1)

-continued

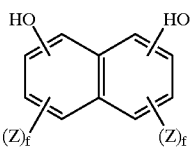
(2)

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$— or a radical conforming to

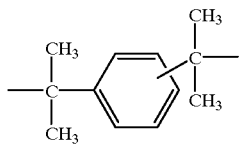

e and g both denote the number 0 to 1; Z denotes F, Cl, Br or C$_1$–C$_4$–alkyl and if several Z radicals are substituents in one aryl radical, they may be identical or different from one another; d denotes an integer of from 0 to 4; and f denotes an integer of from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, 2,2,4-trimethylcyclohexyl-1,1-diphenol and α,α-bis-(hydroxyphenyl)-diisopropylbenzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference.

Further examples of suitable bisphenols are 2,2-bis-(4-hydroxy-phenyl)-propane (bisphenol A), 2,4-bis-(4-hydroxyphenyl)-2-methyl-butane, 1,1-bis-(4-hydroxyphenyl)-cyclohexane, α,α'-bis-(4-hydroxy-phenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4 hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxy-benzophenone, 2,4-bis-(3,5-dimethyl 4-hydroxyphenyl)-cyclohexane, α,α'-bis-(3,5-dimethyl4-hydroxyphenyl)-p-diisopropylbenzene, 2,2,4-trimethyl cyclohexyl-1,1-diphenol and 4,4'-sulfonyl diphenol.

Examples of particularly preferred aromatic bisphenols are 2,2,-bis-(4-hydroxyphenyl)-propane, 2,2-bis-(3,5-dimethyl 4-hydroxyphenyl)-propane, 2,2,4-trimethyl cyclohexyl-1,1-diphenol and 1,1-bis-(4-hydroxy-phenyl)-cyclohexane.

The most preferred bisphenol is 2,2-bis-(4-hydroxyphenyl)-propane (bisphenol A).

The polycarbonates of the invention may entail in their structure units derived from one or more of the suitable bisphenols.

An additional embodiment of the invention is represented by a composition wherein resinous components comprise copoly(carbonate-lactone) block or random copolymer. In this embodiment of the invention, the copolymer contains 1 to 50 mole % of units conforming to

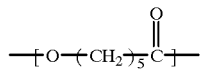

The preparation of such copolycarbonates is well known in the art.

Among the resins suitable in the practice of the invention are included phenolphthalein-based polycarbonates, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05–2.0 mol % (relative to the bisphenols) of polyhydroxyl compounds. Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxyl compounds which may be used for this purpose: phloroglucinol; 4,6-dimethyl-2,4,6-tri-(4-hydroxy-phenyl)-heptane; 1,3,5-tri-(4-hydroxyphenyl)-benzene; 1,1,1-tri-(4-phenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopro-pylidine)-phenol; 2,6-bis-(2'-dihydroxy-5'-methylbenzyl)4-methyl-phenol; 2,4-dihydroxybenzoic acid; 2-(4-hydroxyphenyl)-2-(2,4-dihydroxy-phenyl)- propane and 1,4-bis-(4,4'-dihydroxy-triphenylmethyl)-benzene. Some of the other polyfunctional compounds are 2,4-dihydroxybenzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by reference U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon FCR 2400, Makrolon CD 2005, Makrolon 2600, Makrolon 2800 and Makrolon 3100, all of which are bisphenol based homopolycarbonate resins differing in terms of their respective molecular weights and characterized in that their melt flow indices (MFR) per ASTM D-1238 are about 16.5–24, 13–16, 7.5–13.0 and 3.5–6.5 g/10 min., respectively. A branched polycarbonate such as Makrolon 1239 can also be used. These are products of Bayer Corporation, of Pittsburgh, Pa.

A polycarbonate resin suitable in the practice of the invention is known and its structure and methods of preparation have been disclosed, for example in U.S. Pat. Nos. 3,030,331; 3,169,121; 3,395,119; 3,729,447; 4,255,556; 4,260,731; 4,369,303 and 4,714,746 all of which are incorporated by reference herein.

The dyes suitable in the context of the invention are photochromic compounds selected from the group consisting of benzopyrans, naphthopyrans, spirobenzopyrans, spironaphthopyrans, spirobenzoxa-zines, spironaphthoxazines, fulgides and fulgimides. Such photochromic compounds have been reported in the literature including U.S. Pat. Nos. 4,826,977; 4,931,221; 5,106,998; 5,552,090; 5,628,935 and 5,565,147 (all incorporated herein by reference).

The color range of the naphthopyrans suitable in the present invention is 410 to 500 nm, thus they impart a yellow or orange coloration in their darkened state. In the faded, or bleached condition, the materials exhibit a colorless or pale coloration. The present invention may be used in a mixture or combined with suitable organic photochromic compounds, to obtain, after activation, the formation of neutral coloring such as green, brown and grey. Particularly useful for the purpose are photochromic compounds belonging to the group of naphthopyrans, spiro-indolino-oxazines and spiro-indolino pyrans which are known and are available in commerce. These have a high quantum efficiency for coloring, a good sensitivity and saturated optical density, and an acceptable bleach or fade rate. These compounds may be represented by the following graphic formulae IA1, IA2, and IA3 in which the letters a through n represent the sides of the naphthopyran rings, and the numbers represent the numbering of the ring atoms of the naphthopyrans:

IA1
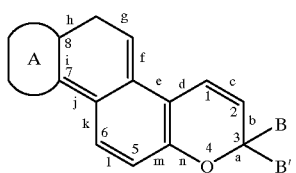

IA2
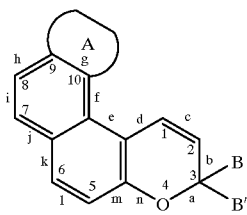

IA3
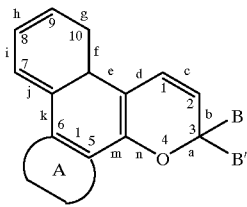

In graphic formulae IA1, IA2, and IA3, the group represented by A is a substituted or un-substituted, five or six member heterocyclic ring fused to the g, i, or I side of the naphthopyran and is represented by the following graphic formulae IIA through IIF:

IIA
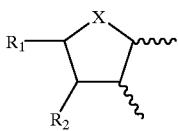

IIB
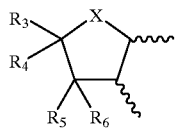

IIC
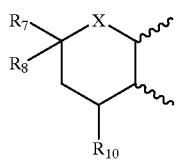

IID
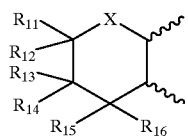

IIE
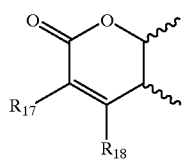

IIF
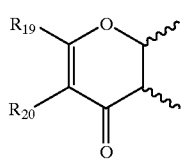

In graphic formulae IIA through IID, X may be an oxygen or a nitrogen atom, said nitrogen atom being substituted with hydrogen or a $C_1$–$C_4$ alkyl. $R_1$ may be hydrogen, $C_1$–$C_6$ alkyl, substituted or unsub-stituted phenyl, carboxy, or $C_1$–$C_6$ alkoxycarbonyl. Preferably, $R_1$ is hydrogen, $C_1$–$C_3$ alkyl, substituted or unsubstituted phenyl, carboxy, or $C_1$–$C_3$ alkoxycarbonyl. $R_2$ may be hydrogen, $C_1$–$C_6$ alkyl, or substituted or unsubstituted phenyl. Preferably, $R_2$ is hydrogen, $C_1$–$C_3$ alkyl, or substituted or unsubstituted phenyl. $R_3$ and $R_4$ may each be hydrogen, $C_1$–$C_6$ alkyl or phenyl. Preferably, $R_3$ and $R_4$ are each hydrogen, $C_1$–$C_3$ alkyl, or phenyl, $R_5$ and $R_6$ may each be hydrogen, $C_1$–$C_6$ alkyl, phenyl, hydroxy, $C_1$–$C_6$ alkoxy, or acetoxy. Preferably, $R_5$ and $R_6$ are each hydrogen, $C_1$–$C_3$ alkyl, phenyl, hydroxy, $C_1$–$C_3$ alkoxy, or acetoxy, $R_7$, $R_8$, and $R_{10}$ may each be hydrogen, $C_1$–$C_6$ alkyl, or phenyl, provided that when $R_7$ is phenyl, $R_8$ is hydrogen or $C_1$–$C_6$ alkyl and when $R_8$ is phenyl $R_7$ is hydrogen or $C_1$–$C_6$ alkyl. Preferably, $R_7$, $R_8$, and $R_{10}$ are each hydrogen, $C_1$–$C_3$ alkyl, or phenyl. Most preferably, $R_1$, $R_2$ $R_3$, $R_4$, $R_5$, $R_6$, $R_7$, $R_8$, and $R_{10}$ are each hydrogen or methyl. $R_{11}$, $R_{12}$, $R_{13}$, $R_{14}$, $R_{15}$, and $R_{16}$ may each be hydrogen, $C_1$–$C_6$ alkyl, $C_1$–$C_6$ alkoxy, or phenyl, Preferably, $R_{11}$, $R_{12}$, $R_{13}$, $R_{14}$, $R_{15}$, and $R_{16}$ are each hydrogen, $C_1$–$C_3$ alkyl, $C_1$–$C_3$ alkoxy, or phenyl. Most preferably, $R_{11}$, $R_{12}$, $R_{13}$, $R_{14}$, $R_{15}$, and $R_{16}$ are each hydrogen, methyl, or methoxy.

In graphic formulae IIE and IIF, $R_{17}$ may be hydrogen, $C_1$–$C_6$ alkyl, substituted or unsubstituted phenyl, or halogen. Preferably, $R_{17}$ is hydrogen, $C_1$–$C_3$ alkyl, substituted or unsubstituted phenyl, or halogen. Most preferably, $R_{17}$ is hydrogen, methyl, or chloro. $R_{18}$ may be hydrogen, $C_1$–$C_6$ alkyl, phenyl, carboxy, $C_1$–$C_6$ alkoxy-carbonyl, or $C_1$–$C_6$ haloalkoxycarbonyl. Preferably, $R_{18}$ is hydrogen, $C_1$–$C_3$ alkyl, phenyl, carboxy, $C_1$–$C_3$ alkoxycarbonyl, or $C_1$–$C_3$ haloalkoxycarbonyl. $R_{19}$ and $R_{20}$ may each be hydrogen, $C_1$–$C_6$ alkyl, or phenyl. Preferably, $R_{19}$ and $R_{20}$ are each hydrogen, $C_1$–$C_3$ alkyl, or phenyl. Most preferably, $R_{18}$, $R_{19}$, and $R_{20}$ are each hydrogen or methyl. $R_1$–$R_{20}$ the phenyl substituents may be $C_1$–$C_3$ alkyl and the halogen or (halo) groups may be chloro or bromo.

In graphic formulae IA1, IA2, and IA3, B and B' may each be selected from the group consisting of (i) the substituted or unsubstituted aryl groups phenyl and naphthyl; (ii) the substituted or unsubstituted heterocyclic aromatic groups pyridyl, furyl, benzofuryl, thienyl, and benzothienyl; and (iii) B and B' taken together form the adamantyl group. The aryl and heterocyclic substituents of B and B' may each be selected from the group consisting of hydroxy, $C_1$–$C_3$ alkyl, $C_1$–$C_5$ haloalkyl, which includes mono-, di-, and trihalo substituents, $C_1$–$C_5$ alkoxy, $C_1$–$C_5$ alkoxy($C_1$–$C_4$) alkyl, $C_1$–$C_5$ dialkylamino, acryloxy, methacryloxy, and halogen, said halogen or (halo) groups being fluoro, chloro, or bromo.

Preferably, B and B' are represented respectively by the following graphic formulae:

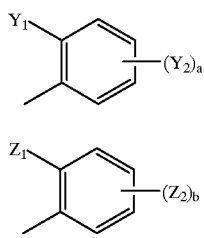

IIIA

IIIB

In graphic formulae IIIA and IIIB, $Y_1$ and $Z_1$ may each be selected from the group consisting of hydrogen, $C_1$–$C_5$ alkyl, $C_1$–$C_5$ alkoxy, fluoro, and chloro; $Y_2$ and $Z_2$ are each selected from the group consisting of $C_1$–$C_5$ alkyl, $C_1$–$C_5$ alkoxy, hydroxy, halogen, e.g., chloro, fluoro, and bromo, acryloxy, and methacryloxy, and a and b are each integers from 0 to 2. Most preferably, $Y_1$ and $Z_1$ are each hydrogen, $C_1$–$C_3$ alkyl, $C_1$–$C_3$ alkoxy, or fluoro, $Y_2$ and $Z_2$ are each $C_1$–$C_3$ alkyl or $C_1$–$C_3$ alkoxy, a is the integer 0 or 1, and b is an integer from 0 to 2.

The preferred naphthopyrans of the present invention are represented in the following graphic formula IB. In graphic formula IB, the A group represents formulae IIA through IID with X being an oxygen atom, formulae IIE and IIF. The A group is fused so that the oxygen atom of formulae IIA through IIF is attached to the number 8 carbon atom of the naphtho portion of the naphthopyran.

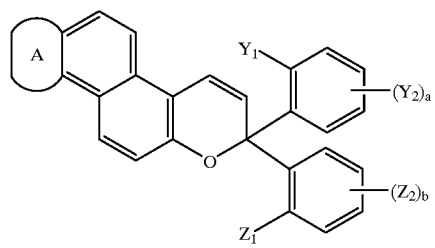

IB

A still preferred dye may be described as naphthopyrans substituted at the 3 position of the pyran ring with (i) an aryl substituent and (ii) a phenyl substituent having a 5- or 6-member oxygen and/or nitrogen containing heterocyclic ring fused at the number 3 and 4 carbon atoms of the phenyl substituent and with a nitrogen-containing hetero-cyclic ring at the 6 position of the naphthyl portion of the naphthopyran compound. These compounds may be represented by the following graphic formula:

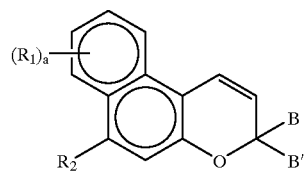

I

In graphic formula I, $R_{1\ may\ be}$ $C_1$–$C_{10}$ alkyl, halogen, or the group, —O—L, wherein L is a $C_1$–$Cl_2$ alkyl, e.g., methyl, ethyl, propyl, butyl, pentyl, hexyl, heptyl, octyl, nonyl, decyl, undecyl, and dodecyl, said halogen being chloro, fluoro, or bromo, and a is the integer 0, 1 or 2. Preferably, $R_1$ is $C_1$–$C_5$ alkyl, fluoro, bromo or the group, —O—L, wherein L is $C_1$–$C_4$ alkyl and a is the integer 0 or 1. Most preferably, $R_1$ is $C_1$–$C_3$ alkyl, fluorine or the group —O—L, wherein L is methyl, and a is the integer 0 or 1.

In graphic formula I, $R_2$ may be a saturated, unsubstituted or mono- or di-substituted nitrogen containing heterocyclic group selected from the following groups represented by graphic formulae IA through IG:

IA

IB

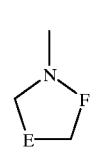

IC

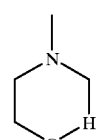

ID

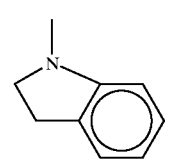

IE

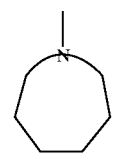

IF

-continued

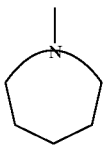
IG wherein E and F in graphic formula IC, are each a nitrogen or carbon atom, provided that when E is nitrogen, F is carbon atom, and G in graphic formula ID, is a nitrogen, oxygen, or carbon atom and H is a nitrogen or carbon atom, provided that when H is nitrogen, G is a carbon atom. Examples of $R_2$ groups include aziridino, azetidino, 1-pyrrolidyl, 1-pyrrolinyl, 1-imidazolidyl, 2-imidazolin-1-yl, 2-pyrazolidyl, 3-pyrazolin-2-yl, morpholino, piperidino, piperazinyl, 4-methyl-1-piperazinyl, 1,4,5,6,-tetrahydropyrimidinyl, 1-indolinyl, hexamethyleneimino, and heptamethyleneimmino. The substituents for $R_2$ can be $C_1$–$C_6$ alkyl and/or $C_1$–$C_6$ alkoxy. Preferably, $R_2$ is an unsubstituted or mono-substituted member of the group consisting of indolinyl, morpholino, and piperidino. More preferably, $R_2$ is morpholino.

B may be the substituted or unsubstituted aryl group, naphthyl or phenyl, said aryl substituents being $C_1$–$C_5$ alkyl, halo($C_1$–$C_5$)alkyl, hydroxy, $C_1$–$C_5$ alkoxy, $C_1$–$C_4$ alkoxy ($C_1$–$C_4$)alkyl, halogen, morpholino, piperidino, or R(R") N—, wherein R and R" are each hydrogen or $C_1$–$C_3$ alkyl, said halogen (or halo) groups being fluoro or chloro. Preferably, B is represented by the following graphic formula II:

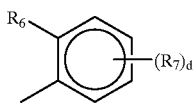
II

In graphic formula II, $R_6$ is hydrogen, $C_1$–$C_4$ alkyl, $C_1$–$C_4$ alkoxy, fluoro, or chloro and each $R_7$ is a $C_1$–$C_4$ alkyl, $C_1$–$C_4$ alkoxy, hydroxy, chloro, or fluoro and d is an integer from 0 to 2. Preferably, $R_6$ is hydrogen and $R_7$ is selected from the group consisting of fluoro, methyl and methoxy.

B' may be represented by one of the following graphic formulae III or IV:

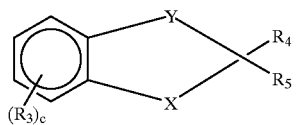
III

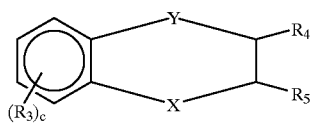
IV

In graphic formula III and IV, X is oxygen or nitrogen and Y is carbon or oxygen, provided that when X is nitrogen, Y is carbon; $R_4$ and $R_5$ are each hydrogen or $C_1$–$C_5$ alkyl; each $R_3$ is a $C_1$–$C_5$ alkyl, $C_5$–$C_5$ alkoxy, hydroxy, or halogen, said halogen substituent being chloro, fluoro, or bromo, and c is an integer from 0 to 3, e.g., 0, 1, 2, or 3. Preferably, B' is represented by graphic formula III or IV, wherein X is oxygen; Y is carbon or oxygen; $R_4$ and $R_5$ are each hydrogen or $C_1$–$C_4$ alkyl; each $R_3$ is a $C_1$–$C_4$ alkyl, $C_1$–$C_4$ alkoxy, hydroxy, or fluoro; and c is the integer 0, 1 or 2. Most preferably, B' is 2,3-dihydroxybenzofuran-5-yl, 2-methyldihy-droxybenzofuran-5-yl, indoline-5-yl, 1,2,3,4-tetrahydroquinoline-6-yl, chroman-6-yl, or 1,3-benzodioxole-5-yl.

In graphic formula III, when $R_4$ and $R_5$ are H and when X is oxygen and Y is carbon and c is zero, the group is a 2,3-dihydrobenzo-furan-5-yl; when X is oxygen and Y is oxygen and c is zero, the group is 1,3-benzodioxole-5-yl; and when X is nitrogen and Y is carbon and c is zero, the group is indoline-5-yl. In graphic formula IV, when X is oxygen and Y is carbon, the unsubstituted group is a chroman-6-yl; when X is oxygen and Y is oxygen, the unsubstituted group is a 1,4-benzodioxan-6-yl; and when X is nitrogen and Y is carbon, the unsubstituted group is 1,2,3,4-tetrahydroquinoline-6-yl. For brevity, these groups will be referred to herein as fused heterocyclicphenyl groups.

The preferred naphthopyran dye is 3,3-diphenyl-3-H-naphtho[2,1-b]pyran represented by the formula

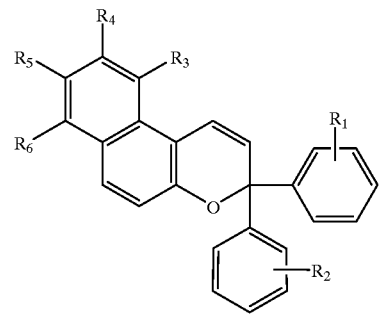

where $R_1$ to $R_6$ denote hydrogen.

The spiroxazines suitable in the present invention are known: see for instance U.S. Pat. Nos. 3,562,172; 3,578,602; 4,215,010 and 4,342,668, all of which are incorporated by reference herein. Essentially, the spirooxazines suitable in the present invention may be described by the formula

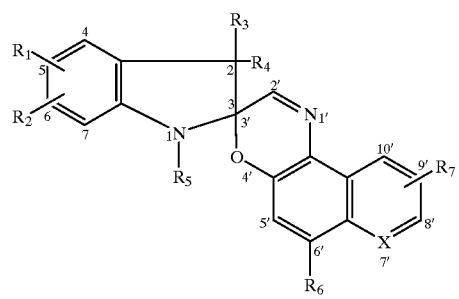
(I)

where:
  $R_1$ and $R_2$ independently represent a hydrogen or halogen (fluorine, chlorine or bromine) atom or a group chosen from $C_1$–$C_5$ linear or branched alkyl, $C_1$–$C_5$ perfluoroalkyl, $C_1$–$C_5$ alkoxy, nitro or cyano;
  $R_3$ and $R_4$ independently represent $C_1$–$C_5$ linear or branched alkyl, phenyl or benzyl groups; or $R_3$ and $R_4$ when considered jointly with the carbon atom to which they are linked form a $C_5$–$C_8$ cycloalkyl group;
  $R_5$ represents a $C_1$–$C_5$ linear or branched alkyl, phenyl, benzyl or allyl group;

$R_6$ represents a hydrogen atom or a $C_1$–$C_5$ linear or branched alkyl group or the group -$NR_8R_9$ where $R_8$ is a $C_1$–$C_5$ linear or branched alkyl, phenyl or benzyl group $R_9$ is hydrogen or has the same meaning as $R_8$, or $R_8$ and $R_9$ when considered jointly with the nitrogen atom to which they are linked form a cyclic structure comprising 5–12 members and possibly containing a further heteroatom chosen from oxygen and nitrogen; and $R_7$ represents a hydrogen or halogen (fluorine, chlorine or bromine) atom or a group chosen from: $C_1$–$C_5$ linear or branched alkyl, $C_1$–$C_5$ alkoxy, cyano, thio-ether and carboxylated ester with 1–3 carbon atoms in the ester portion, or represents an aromatic or heterocyclic condenses ring;

X represents CH or N—.

In particular, the groups $R_1$ and $R_2$, when not hydrogen, can be linked in any of positions 4, 5, 6 and 7 of the indoline part of the molecule. In addition the group $R_7$, if not representing hydrogen or an aromatic or heterocyclic condensed ring, can be present in any of the positions 7', 8', 9' and 10' of the naphthalene part of the molecule.

In the preferred embodiment, photochromatic compounds corresponding to general formula (I) are used in which:

$R_1$ and $R_2$ independently represent a hydrogen atom or the methyl group;

$R_3$ and $R_4$ each represent the methyl group or jointly represent the cyclohexyl group;

$R_5$ represents the methyl group;

$R_6$ represents a hydrogen atom or the —$NR_8R_9$ group where the groups $R_8$ and $R_9$ together with the nitrogen atom to which they are linked form a piperidyl, morpholyl, pyrrolidyl or hexamethyleneimino ring structure; and $R_7$ represents a hydrogen atom; and X represents CH.

Examples of preferred photochromatic compounds used according to the present invention are 1,3,3,4,5 or 1,3,3,5, 6-pentamethyl spiro (indoline-2,3'-[3H]-naphtho-(2,1-b)-(1, 4)-oxazine); 1,3,3-trimethyl spiro (indoline-2,3'-[3H]-naphtho-2,1-b)-(1,4)-oxazine); 1,3,3-trimethyl spiro (indoline-6-(1 -piperidyl)-2,3'-[3H]-naphtho-2,1 -b)-(1,4)-oxazine; 1,3,3-trimethyl spiro (indoline-6'-(1-morpholyl)-2, 3'-[3H]-naphtho-(2,1-b)-(1,4)-oxazine); 1,3,3,4,5- or 1,3,3, 5,6-pentamethyl spiro (indoline-6'-(1-piperidyl)-2,3'-[3H]-naphtho-(2, 1-b)-(1 4)-oxazine); and 1,3,3-trimethyl spiro (indoline-6'-(1-piperidyl)-9'-(methoxy)-2,3'-[3H]-naphtho-(2, 1-b)-(14)-oxazine).

The spiropyrans useful for the purposes of the present invention, are photochromatic organic compounds which can be defined by the following general formulae (II), (III), (IV) and (V):

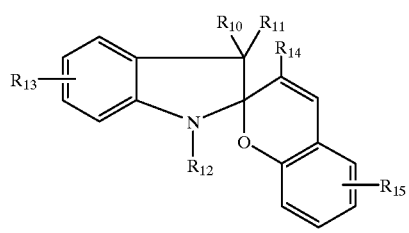
(II)

indoline naphtho pyrans

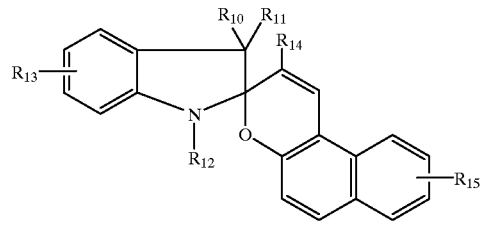
(III)

benzothiazoline spiro pyrans

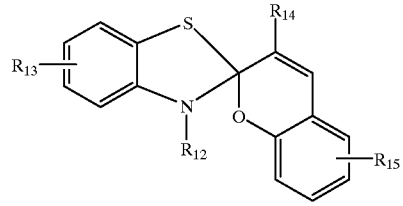
(IV)

benzoxazoline spiro pyrans

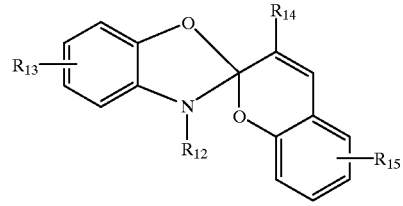
(V)

in the preceding general formulae:

$R_{10}$ and $R_{11}$ represent alkyl or aryl groups;

$R_{12}$ represents an alkyl, aryl group or alkyl substituted group (such as hydroxyalkyl, halogenalkyl, carbalcoxyalkyl, alkoxyalkyl and amminoalkyl);

$R_{14}$ represents hydrogen or an alkyl, aryl or alkoxy $R_{13}$ and $R_{15}$ represent hydrogen or mono- or poly-substitution groups, chosen among alkyl and substituted alkyl groups, or halogen, nitro or alkoxy.

Fulgides and fulgimides suitable in the context of the invention are known and have been described in the literature (see, for instance, Applied Photochromic Polymer Systems, Edited by C. B. McArdle, Blackie USA: Chapman & Hall, New York, 1992 pp. 80-120) incorporated by reference herein.

The inventive composition may be used in applications requiring photochromic materials which were referred to above. Included are photochromic lenses such as are described in U.S. Pat. No. 5,531,940, the specification of which is incorporated herein by reference.

The invention is further illustrated but is not intended to be limited by the following examples in which all parts and percentages are by weight unless otherwise specified.

EXPERIMENTAL

Compositions according to the invention were prepared and their photochromic properties determined. In order to measure the darkening rate, the samples were exposed to UV radiation (Spectrolin long wave length —365 nm- lamp) for ten minutes. The absorbance at the peak maximum of the dye (424 nm for variacol Yellow L) was recorded at four second intervals of a ten minute period using a spectrophotometer (Perkin-Elmer Lambda 9 UVNis). Fading rate was measured in a similar manner after first removing the UV radiation source.

As UV radiation strikes the samples which were tested, the incorporated photochromic dye begins to convert from a colorless to a colored state. More color develops as the exposure to UV radiation continues until the color intensity reaches a substantially constant plateau. Since the absorbancy also increases as the photochromic dye converts from a colorless to a colored state, this value is a convenient measure of the rate at which the material darkens.

In the table below, T½ refers to the time (in seconds) to reverse to 50% absorbancy. As the results shown in the table below demonstrate, the control composition which contained only polycarbonate and the dye of the invention proved to have a slow rate in darkening and in fading; its T½ values were 4 minutes and 5 seconds.

Articles molded of PCL are opaque and compositions containing only PCL and the dye of the invention are unsuitable for applications where transparency is a requirement.

The compositions which were prepared and evaluated as tabulated below contained as PCL, Tone 767 from Union Carbide, a resin characterized in that its weight average molecular weight is 50,000 g/mole). The dye used in the examples, at a level of 0.1 pphr, was 3,3-diphenyl-3-H-naphtho[2,1-b]pyran. The table shows the fade reversal rates.

TABLE 1

| | Resinous components (wt %) | | |
|---|---|---|---|
| Example | Polycarbonate | PCL | $T_{1/2}$ (seconds) |
| 1-1 | 100[1] | 0 | 245 |
| 1-2 | 65[1] | 35 | 18 |
| 1-3 | 75[1] | 25 | 42 |
| 1-4 | 100[2] | 0 | >420 |
| 1-5 | 65[2] | 35 | 29 |

[1] the polycarbonate resin was Makrolon 2458 homopolycarbonate based on bisphenol A, having a Melt Flow rate in accordance with ASTM D-1238 of about 20 g/10 min.
[2] a copolycarbonate based on bisphenol-A (65%) and 2,2,4-trimethylcyclohexyl 1,1 diphenol (35%).

The results show the effectiveness of the dyes of the invention to render the composition suitable as photochromic compositions.

The photochromic performance of a composition of the invention is further demonstrated by the results of its darkening and fading as tabulated below. The rates of darkening of Compositions 1-1 and 1-2 above, upon exposure of test specimens (100 mils thick) to 424 nm light source are shown in Table 2.

TABLE 2

| | Absorbance upon exposure to UV radiation Time (minutes) | | | | |
|---|---|---|---|---|---|
| Composition | 0 | 1 | 2 | 4 | 10 |
| 1-1 | 0.0982 | 0.4239 | 0.4822 | 0.5313 | 0.5657 |
| 1-2 | 0.1687 | 0.6436 | 0.7409 | 0.7976 | 0.8508 |

The rate of fading upon removal of these specimens (Compositions 1-1 and 1-2) from the light source is shown in Table 3.

TABLE 3

| | Fade Time (seconds) | |
|---|---|---|
| Composition | 50%[1] | 30%[2] |
| 1-1 | 245 | 46 |
| 1-2 | 18 | 8 |

[1] Fade Time 50% refers to the time interval from the removal of the fully darkened material from the light source and ending when the reversal reached 50% of the maximum darkening.
[2] Fade Time 30% refers to the time interval from the removal of the fully darkened material from the light source and ending when the reversal reached 30% of the maximum darkening.

In an additional, parallel set of experiments the photochromic compound used was spiroxazine conforming to:

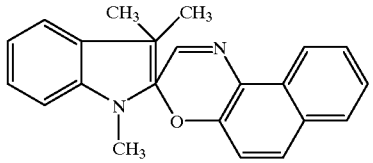

The results were as follows:

TABLE 4

| | Resinous components (wt %) | | |
|---|---|---|---|
| Example | Polycarbonate | PCL | $T_{1/2}$ (seconds) |
| 4-1 | 100[1] | 0 | 155 |
| 4-2 | 65[1] | 35 | 15 |
| 4-3 | 75[1] | 25 | 47 |
| 4-4 | 100[2] | 0 | 300 |
| 4-5 | 65[2] | 35 | 24 |

[1] the polycarbonate resin was Makrolon 2458 homopolycarbonate based on bisphenol A, having a Melt Flow rate in accordance with ASTM D-1238 of about 20 g/10 min.
[2] a copolycarbonate based on bisphenol-A (65%) and 2,2,4-trimethylcyclohexyl 1,1 diphenol (35%).

The photochromic performance of compositions of the invention is further demonstrated by the results of its darkening and fading as tabulated below. The rates of darkening of Compositions 4-1 and 4-2 above, upon exposure of test specimens (100 mils thick) to 610 nm light source are shown in Table 5.

TABLE 5

| | absorbance upon exposure to UV radiation time (minutes) | | | | |
|---|---|---|---|---|---|
| Comp. | 0 | 1 | 2 | 4 | 10 |
| 4-1 | 0.079 | 0.1813 | 0.2031 | 0.2174 | 0.2289 |
| 4-2 | 0.0759 | 0.2746 | 0.2842 | 0.2961 | 0.2863 |

The rate of fading upon removal of these specimens (Compositions 4-1 and 4-2) from the light source is shown in Table 6.

TABLE 6

| | Fade Time (seconds) | |
|---|---|---|
| Composition | 50%[1] | 30%[2] |
| 4-1 | 155 | 44 |
| 4-2 | 15 | 6 |

[1]Fade Time 50% refers to the time interval from the removal of the fully darkened material from the light source and ending when the reversal reached 50% of the maximum darkening.
[2]Fade Time 30% refers to the time interval from the removal of the fully darkened material from the light source and ending when the reversal reached 30% of the maximum darkening.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising
   (A) at least one resinous component selected from the group consisting of (i) a homogeneous blend of polycarbonate resin and polycaprolactone and (ii) a copoly(carbonate-lactone) copolymer, and
   (B) at least one photochromic compound selected from a group consisting of benzopyrans, naphthopyrans, spirobenzopyrans, spironaphthopyrans, spirobenzoxazines, spironaphthoxazines, fulgides and fulgimides,
wherein said compound is present in an amount of 0.01 to 1.0 parts per hundred parts of weight of said (A).

2. The thermoplastic molding composition of claim 1 wherein said (ii) is a block copolymer containing 1 to 50 mole % of units conforming to

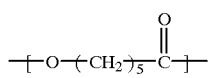

3. The thermoplastic molding composition of claim 1 wherein said (ii) is a random copolymer containing 1 to 50 mole % of units conforming to

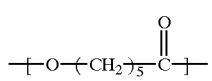

4. The composition of claim 1 wherein said (B) is a benzopyran.

5. The composition of claim 1 wherein said compound is present in an amount of 0.03 to 0.5 parts per hundred parts by weight of said (A).

6. The thermoplastic molding composition of claim 1 wherein said (i) contains about 5 to 50 percent polycaprolactone relative to the weight of said blend.

7. The composition of claim 1 wherein said (B) is a naphthopyran.

8. The composition of claim 1 wherein said (B) is a spirobenzopyran.

9. The composition of claim 1 wherein said (B) is a spironaphthopyran.

10. The composition of claim 1 wherein said (B) is a spirobenzoxazine.

11. The composition of claim 1 wherein said (B) is a spironaphthoxazine.

12. The composition of claim 1 wherein said (B) is a fulgide.

13. The composition of claim 1 wherein said (B) is a fulgimide.

14. The composition of claim 1 wherein said compound conforms to

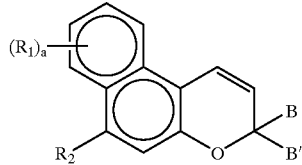

wherein $R_1$ is $C_1$–$C_{10}$ alkyl, halogen, or the group, —O—L, wherein L is a $C_1$–$C_{12}$ alkyl;

a denotes 0, 1 or 2; $R_2$ is a saturated nitrogen containing heterocyclic group; B is an aryl group and B' is selected from the group consisting of III and IV

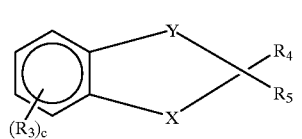

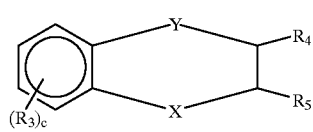

wherein X is oxygen or nitrogen and Y is carbon or oxygen, provided that when X is nitrogen, Y is carbon; and where $R_4$ and $R_5$ denote hydrogen or $C_1$–$C_5$ alkyl; $R_3$ is a $C_1$–$C_5$ alkyl, $C_1$–$C_5$ alkoxy, hydroxy, or halogen atom, and c is an integer from 0 to 3.

15. The composition of claim 1 wherein said compound conforms to

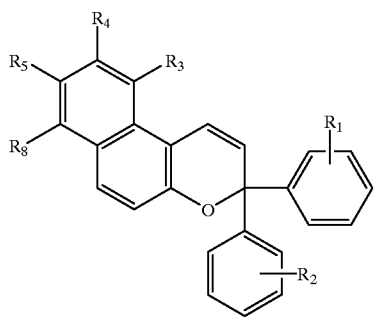
where $R_1$ to $R_6$ denote hydrogen.
16. The composition of claim 1 wherein said compound conforms to
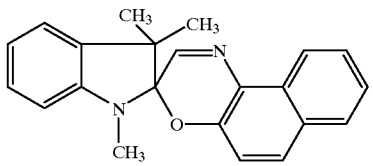
* * * * *